Oct. 6, 1964  D. M. WILLYOUNG  3,151,479
METHOD FOR TESTING DYNAMOELECTRIC MACHINES
Filed Aug. 22, 1961  2 Sheets-Sheet 1
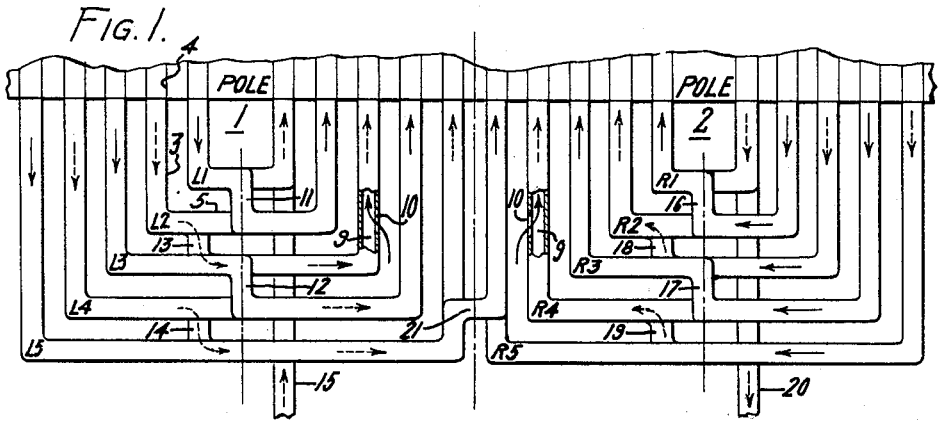
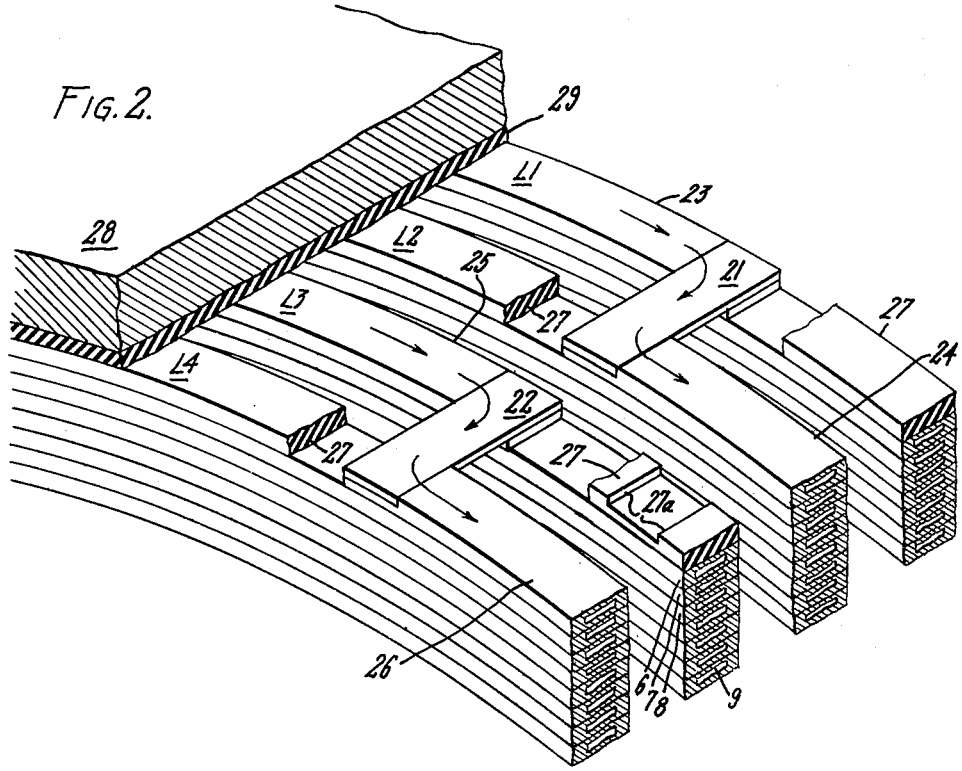
INVENTOR
DAVID M. WILLYOUNG
BY W. C. Crutcher
HIS ATTORNEY

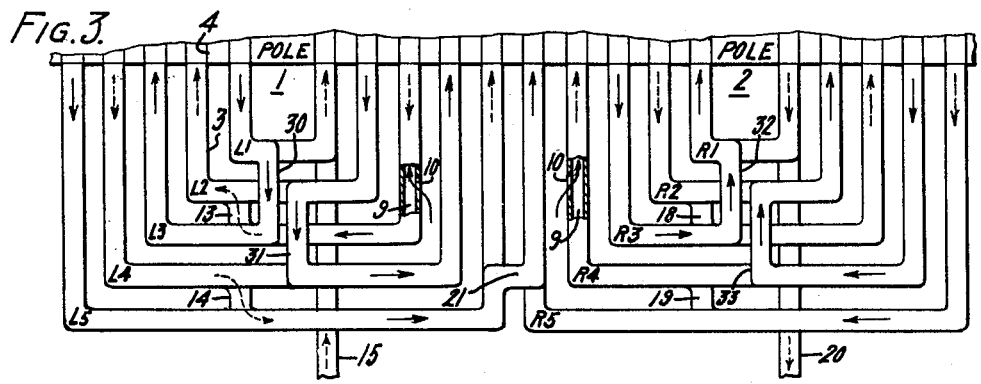
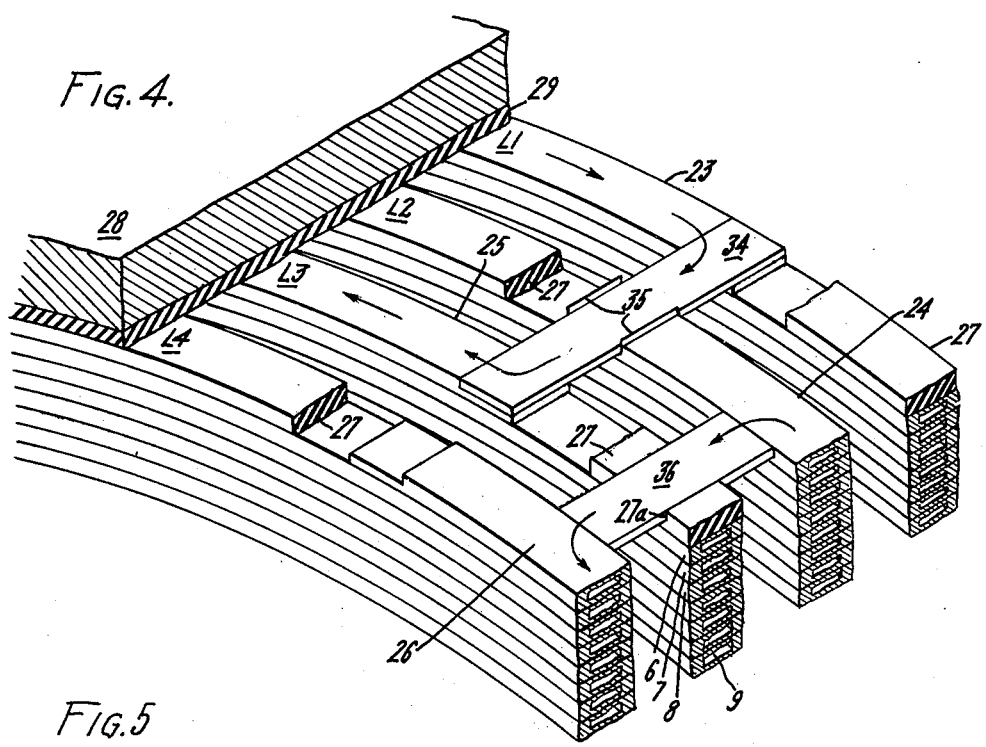
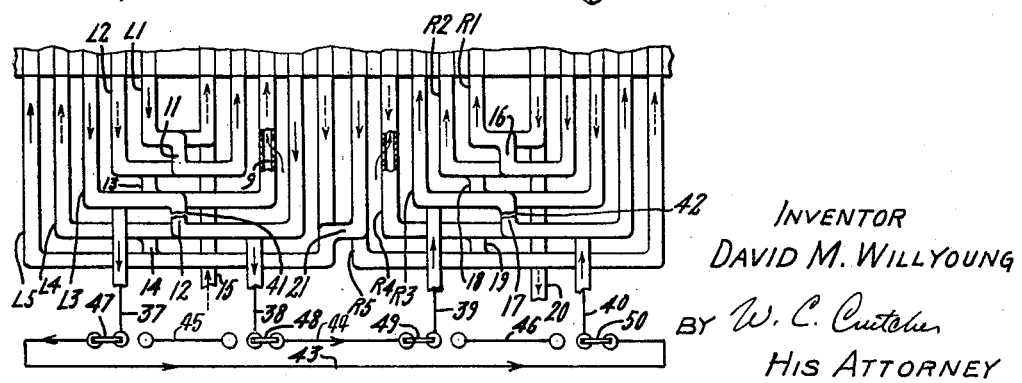
INVENTOR
DAVID M. WILLYOUNG
BY W. C. Crutcher
HIS ATTORNEY

United States Patent Office 3,151,479
Patented Oct. 6, 1964

3,151,479
METHOD FOR TESTING DYNAMOELECTRIC MACHINES
David M. Willyoung, Scotia, N.Y., assignor to General Electric Company, a corporation of New York
Filed Aug. 22, 1961, Ser. No. 133,109
4 Claims. (Cl. 73—118)

This invention relates to a method for testing the rotor windings in a large generator, and more particularly to a method for testing the effectiveness of the normal cooling arrangement of a generator rotor while operating the generator at greatly reduced load.

It is difficult to obtain full-load test data on a large dynamoelectric machine, such as a turbine-generator, under factory conditions. Since it is impracticable under such conditions to provide an impedance representing full load, large generators are often tested with special connections at greatly reduced loads. When desiring to test the generator field windings, and particularly the cooling provisions thereof, it is desirable to pass the rated field current through the windings in order to generate the anticipated ohmic losses in the form of heat. In order for the cooling arrangement to function as intended, it is also desirable to turn the rotor at normal "rated" speed, and to operate all of the accessory cooling equipment, such as pumps or fans. Under two methods of testing the generator at no load, i.e., open-circuited or short-circuited, rotor current is limited for the following reasons:

When the rotor is turning at normal speed with the armature terminals short-circuited, rated rotor current cannot be applied since it would generate currents in the short-circuited stator windings which are well in excess of the load currents for which these windings are designed. This would result in dangerously high heating in the windings and core end iron.

On the other hand, if the generator is tested with the armature open-circuited, once again the rotor current must be limited to a fraction of its rated value, since in this case the rotor m.m.f. is unopposed by any stator counter m.m.f. (armature reaction). If rated rotor m.m.f. were applied, with the stator winding open-circuited, the generator flux would ordinarily exceed the rated design flux by 50 to 100% or more, depending on the degree of saturation in the magnetic circuit. This would raise the generated voltages of the armature windings correspondingly, stressing the armature winding ground insulation sufficiently to appreciably shorten its life. The core interlamination insulation would be similarly subjected to abnormally high voltage.

The above-described unbalanced conditions between stator and rotor currents are further accentuated by the fact that the heating in the rotor coils is a function of the square of the field current. For example, under short-circuited test, if the rotor current is limited to 60% of its normal value, the heating is only 36% of its usual value.

The problem then is to test the effectiveness of the rotor cooling arrangement when rated current is circulated through the rotor conductors during factory tests while insuring that the armature is not damaged by excessive heating or excessive electrical stress, when it is operated with its terminals either short-circuited or open-circuited.

Two methods have been proposed for testing large generators under factory conditions with full field excitation. One involves the use of providing an artificial load for the generator, such as a large reactor. Another method is to operate two generators at once and connect the armatures opposing one another. Both of these methods are quite expensive and are not needed with the present invention.

Accordingly, one object of the present invention is to provide an improved method for testing the field windings on the rotor of a large generator, without overloading the generator or exceeding the temperature limits of the generator armature.

Another object of the invention is to provide an improved method for testing the cooling arrangement of generator field windings at field currents in excess of those permissible when the generator is operated under short-circuit or open-circuit conditions.

Another object of the invention is to provide an improved method for reducing the flux produced by the field windings without substantially rearranging the cooling scheme thereof.

Still another object of the invention is to provide an improved method for testing the coils on a generator rotor without substantially disturbing the coils or removing them from the rotor slots.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a developed plan view of the normal connections of the end turns in a typical rotor field winding.

FIG. 2 is a schematic perspective view of the end turns of several coils of FIG. 1 showing the coil-to-coil connections, FIG. 3 is a developed plan view of the rotor end turns similar to FIG. 1, but with the coils connected for testing according to one form of the invention, FIG. 4 is a schematic perspective view similar to FIG. 2, but showing altered coil-to-coil connections for testing, and FIG. 5 is a developed plan view of the rotor end turns similar to FIG. 1 but showing another form of the invention.

Briefly stated, the method comprises changing the connections between coils, preferably in accessible locations such as the top layer cross connections in the end turn region, to cause certain of the coils to oppose the remainder of the coils and thus reduce the net magnetomotive force produced by the rotor field windings.

Referring now to FIG. 1 of the drawing, the end turns at the collector end of the generator rotor are shown in schematic fashion as though the winding were composed of one continuous strand, although it will be understood that the winding is often assembled and brazed in special sections, especially where there is to be provision for cooling passages to carry gas or liquid. A developed view over the full 360° circumference of the rotor is shown so that the diametrically opposite pole portions 1, 2 are both evident.

The field windings comprise coils L1–L5 symmetrically disposed about pole portion 1 and coils R1–R5 about pole 2. Each coil, such as L2 for example, is made up of straight "slot-lying" portions, one of which is seen at 3, lying in a longitudinal rotor slot 4, and arcuate end turn portions, as seen at 5. The separate strands 6, 7, 8 of each coil are radially stacked on top of one another and separated by turn insulation (not shown).

The coils also have provision for cooling the field windings by means of a coolant fluid. This is merely indicated symbolically by means of a cooling passage 9, with means to provide entry of a fluid, such as hydrogen gas, through a port 10 as indicated by the arrow. Many suitable cooling arrangements for cooling rotors are known in the prior art which include the use of hydrogen, air, and liquid, with the fluid passing either in intimate thermal contact with the rotor windings or through the rotor body itself, and the exact arrangement used is not material to this invention.

In order to clearly indicate continuity of the electrical connections, FIG. 1 has been drawn with the connections between coils shown as though the coils were composed of one continuous strand and the cross connections have also been moved away from the pole centerline in some cases to provide additional clarity. In assembling the rotor field, so as to remove the necessity for connecting a top layer of one coil to a bottom layer of another coil, the expedient is conventionally followed, as shown in FIG. 1, of forming the coils so that the odd coils L1, L3, L5, R1, R3, R5 are wound clockwise moving from top to bottom of the slot or radially inward, while the even coils L2, L4, R2, R4 are wound clockwise moving from bottom to top of the slot or radially outward. Thus the coil-to-coil connections can be made from top-to-top or bottom-to-bottom while maintaining the proper direction of the excitation current around the pole. Coils L1, L2 and L3, L4 are connected by top-to-top connections 11, 12 respectively, while coils L2, L3 and L4, L5 are connected by bottom-to-bottom connections 13, 14 respectively. A field supply lead 15 connected to a source of excitation current (not shown) also enters beneath the arcuate end turn portions 5 and is connected to the bottom layer of coil L1.

Similarly on coils R1–R5, top-to-top connections 16, 17 and bottom-to-bottom connections 18, 19 serve to connect the coils together and an excitation lead 20 is shown leading to the bottom layer of the inner coils R1. An additional top-to-top connection 21 connects outer coils L5, R5. Thus the current flows as indicated by the arrows, the convention being that a dotted arrow represents current flow in the bottom or radially innermost layers, while the solid arrows represent current flow in the top or radially outermost layers. The drawing shown in FIG. 1 illustrates the "normal" coil-to-coil connections for a typical generator field winding in schematic form and connected in conventional fashion. Although only five coils per pole side are shown, obviously any number of coils per pole-side could be employed, and also the sense in which the coils are wound on the rotor could also be reversed.

The perspective view of FIG. 2 is shown to illustrate more clearly one type of coil-to-coil connection. There the coils L1–L4 are shown to be composed of stacks of strands 6, 7, 8 having passages 9 for passing cooling fluid through the strands. Instead of the top-to-top connections being shown as though the strands were continuous, as in FIG. 1, a more accurate representation shows connecting pieces 21, 22 serving to cross connect circumferential coil portions 23, 24 and 25, 26 respectively. In order to provide uniformity of radial distance of members from the rotor axis, insulating blocking 27 is employed. The end turns are held in place by a retaining ring, a portion of which is seen at 28, and are insulated from the retaining ring by insulation 29. It can be seen that the space beneath retaining ring 28 is quite congested and that the bottom-to-bottom connections are normally inaccessible unless the outer strand layers are removed. On the other hand, the top-to-top connecting pieces 21, 22 are exposed by merely sliding back the retaining ring.

The connections for testing the rotor field winding are illustrated, according to one modification of the invention, in FIGURES 3 and 4, where like elements have been designated with like reference numerals.

First, comparing FIG. 3 with FIG. 1, it will be noted that the top-to-top connection 11 of FIG. 1 has been temporarily replaced by a top-to-top connection 30 in FIG. 3, which extends from coil L1 to coil L3; also, top-to-top connection 12 of FIG. 1 has been replaced by a top-to-top connection 31 in FIG. 3, which extends from coil L2 to coil L4. Similar temporary top-to-top connections 32, 33 connect coils R1–R3 and coils R2–R4 respectively.

By following the direction of current flow as indicated by the arrows, it will be seen that the new top-to-top connections shown in FIG. 3 reverse the "normal" direction of current flow in coils L2, L3. Similarly, current flow in coils R2, R3 is reversed. The magnetomotive force produced by the current flowing in coils L2, L3, R2, R3 generates a magnetic field which is the reverse of the field generated by the remainder of the coils. Therefore, the net magnetomotive force of the field winding is decreased when the winding is placed in its test or "opposed coil" configuration.

Comparing FIG. 2 with FIG. 4, a practical means of achieving these test connections may be seen. Here, instead of using a short strap such as 21 in FIG. 2 to connect strands 23, 24, a longer strap 34 is employed which is attached by brazing between strands 23, 25. Strap 34 is insulated from strand 24 by temporary insulation 35. Another special strap 36 is brazed between strands 24, 26 as shown. The insulating block may be notched as indicated at 27a to accommodate strap 36. Temporary straps are used in a similar manner for the other rotor pole (not shown) to connect coil R1 with R3 and R2 with R4. It will be apparent that it is unnecessary to disturb the coils or the cooling arrangement in any manner other than by removing the retaining ring 28 and making these temporary top-to-top connections. They can be removed very easily and replaced with the usual coil-to-coil connections, after the test, without impairing the integrity of the windings.

Another modification of the invention is illustrated in FIG. 5 where it is possible to perform tests of the field winding in both "opposed coil" and "normal" configuration without removing the retaining ring. Here, leads 37, 38, 39, 40 are connected to the top strands of coils L3, L4, R3, R4 respectively and are led outside the retaining ring enclosure (not shown) to a point on the rotor where they may be connected by jumpers. The "normal" top-to-top connections 12, 17 (see FIGS. 1 and 5) between coils L3, L4 and R3, R4 are temporarily disconnected as indicated at 41, 42. External jumpers 43–46, which are indicated schematically, are arranged so that they can be connected to leads 37–40 by movable connecting straps 47–50. Here straps 47, 50 connect lead 37 to lead 40 via jumper 43. Similarly, straps 48, 49 connect lead 38 to 39 via jumper 44. This circuit is in the "opposed coil" configuration. By following the arrows, it will be seen that the outer coils L4, L5, R4, R5 have the current flowing in an opposite direction from that in FIG. 1, and hence produce a magnetomotive force opposing that of the remainder of the coils and decreasing the net magnetomotive force available to produce magnetic flux.

On the other hand, the normal current flow can be obtained by manipulating straps 47–50. They may be used to connect leads 37, 38 via jumper 45 and leads 39, 40 via jumper 46. In this case, the electrical connections would be effectively the same as in FIG. 1, yet it would be unnecessary to remove the retaining ring to change the connections back and forth.

The operation of the invention is as follows. The arrangement shown in FIGS. 3 and 4 causes the magnetomotive force produced by coils L2 and L3 to oppose that produced by coils L1, L4 and L5. Also coils R2, R3 oppose coils R1, R4 and R5. The net magnetomotive force per pole side is therefore roughly that produced by one coil rather than the combined output of five coils.

In the FIG. 5 arrangement, the outer coils L4, L5, R4, R5 oppose the magnetomotive force produced by coils L1, L2, L3, R1, R2, R3. The net magnetomotive force is again drastically reduced for the same value of excitation current.

By means of the arrangements in FIGS. 3, 4, and 5, the coils can be connected therefore so as to decrease the net magnetomotive force produced by the rotor field windings. However, it is to be particularly noted that full rotor field current can be passed through all of the coils in series, so that the ohmic losses produced by the current will heat the windings in the expected manner and the cooling arrangement can be tested, such as by measuring the temperature of the coolant leaving the windings or by using thermocouples to measure the winding temperature. After the test, the retaining ring can be removed and the normal top-to-top connections made in very simple fashion without disturbing the windings.

By the use of the FIG. 5 arrangement, comparative test data can be obtained by means of manipulating straps 47–50 to connect the coils either in normal or in opposed fashion. This is particularly useful when magnetization and saturation data on the generator with normal rotor connections, or data on the stator with full-load stator current flowing, is needed from the same series of tests during which the rotor cooling system performance is to be evaluated, since the straps 47–50 can be manipulated without removing the rotor from the generator.

It will be appreciated that the method indicated in FIGS. 3 and 4 and that in FIG. 5 is essentially the same. The FIG. 3, FIG. 4 arrangement reverses some of the magnetomotive force within each pole side independently of the other pole side. In the FIG. 5 arrangement, the reverse current flow producing the opposing magnetomotive force is in the outer coils of both pole sides.

It should be apparent that although one particular form of coil-to-coil connection is shown, the method is equally applicable to many types of connections whether the connections are made at the corners, or the pole center lines, and regardless of the type of cooling used once the principle of the invention is understood by one skilled in the art. Although top-to-top connections were manipulated, inasmuch as they were fairly accessible with the retaining ring removed, it is also possible to practice the invention by manipulating other accessible coil-to-coil connections, such as the bottom-to-bottom connections of outer coils. It should also be understood that the method is equally applicable to four-pole machines, as well as the two-pole machine described.

The method enables the field windings of a generator rotor to be tested with a minimum of difficulty and allows full field current to be passed therethrough while substantially reducing the magnetomotive force produced by the field winding which would otherwise limit the ability to perform a test. Similarly, it will be appreciated that the cooling arrangement can be tested with the rotor turning at normal speed, and with field windings generating heat in the same manner as the generator would under actual load conditions.

Further objects and advantages will occur to those skilled in the art and it is intended to cover in the appended claims all such modifications as fall within the true spirit and scope of the invention.

What I claim as new and desire to secure by Letters Patent of the United States is:

1. The method of testing generator field windings comprising the steps of providing a generator having a wound rotor for producing a rotating magnetic field for the generator including a plurality of series-connected coils thereon normally arranged to produce a combined magnetomotive force, temporarily changing the connections between some of said coils to produce magnetomotive force opposing that produced by the remainder of said coils, and operating said generator at reduced load with field excitation current in the rotor winding in excess of that which would be permissible if said coils were connected in normal fasion.

2. The method of testing the cooling arrangement for generator field windings comprising the steps of providing a generator having a wound rotor for producing a rotating magnetic field for the generator, said rotor including a plurality of series-connected fluid-cooled coils thereon, temporarily changing the connections between some of said coils to decrease the net magnetomotive force produced by the combined coils without substantially changing the cooling arrangement of the coils, and operating said generator at substantially no load with substantially "rated" field excitation current while measuring the effectiveness of said cooling arrangement.

3. The method of testing generator field windings comprising the steps of providing a generator having a wound rotor for producing a rotating magnetic field for the generator, said rotor including a plurality of series-connected coils thereon having alternating top-to-top and bottom-to-bottom connections between coils, temporarily changing the accessible outer connections between some of said coils so as to decrease the net magnetomotive force produced by the combined coils without otherwise substantially disturbing said coils, and operating said generator with field excitation current in excess of that which would be permissible if said coils were connected in combined fashion.

4. The method of testing a cooling arrangement for generator field windings comprising the steps of providing a generator having a wound rotor for producing a rotating magnetic field for the generator, said rotor including a plurality of radially stacked coils thereon, odd numbers of said coils being wound in reverse manner from even numbers of said coils and said coils also having alternating top-to-top and bottom-to-bottom connections, whereby said coils are normally arranged to produce a combined magnetomotive force, said winding also having passages for a coolant fluid passing in heat exchange relationship therewith, temporarily changing some of said top-to-top connections to decrease the net magnetomotive force produced by the combined coils, operating said generator at reduced load with substantially "rated" field excitation current, and causing coolant fluid to flow through said passages while measuring the effectiveness of said cooling arrangement.

References Cited in the file of this patent
UNITED STATES PATENTS
3,049,633    Cain _____ Aug. 14, 1962